Patented Oct. 10, 1950

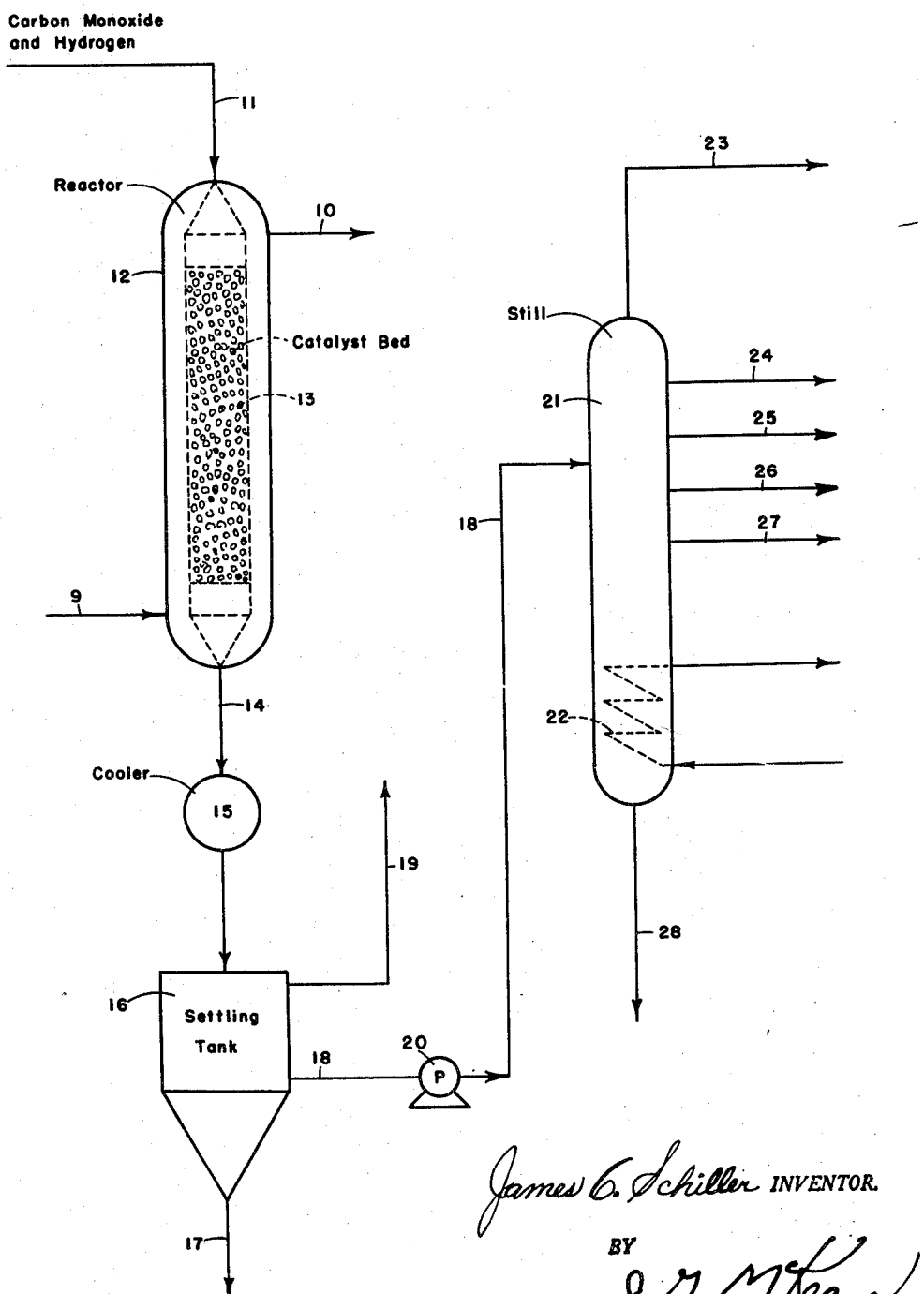

2,525,080

UNITED STATES PATENT OFFICE 2,525,080

METHOD FOR SYNTHESIS OF HYDROCARBONS AND OXYGENATED ORGANIC COMPOUNDS

James C. Schiller, Baytown, Tex., assignor, by mesne assignments, to Standard Oil Development Company, Elizabeth, N. J., a corporation of Delaware Application December 20, 1946, Serial No. 717,579

9 Claims. (Cl. 260—449.6)

The present invention is directed to an improved method for effecting the synthesis of hydrocarbons and oxygenated organic compounds from carbon monoxide and hydrogen.

It is well known to the art to produce hydrocarbons by the reaction of carbon monoxide and hydrogen in the presence of a catalyst and under well defined conditions of temperature, pressure, and contact time, these conditions being adjusted for the particular type of catalyst being employed. The products obtained by the reaction of carbon monoxide and hydrogen also vary in type, configuration, and molecular weight depending upon the type of catalyst employed. Paraffinic and olefinic hydrocarbons are the usual products obtained in a reaction of this type; by-products consist chiefly of water, oxygenated compounds and carbon monoxide. Experience has shown that the oxygenated compounds are predominantly alcoholic in nature and that small amounts of esters, organic acids, ketones and aldehydes are usually also formed.

Workers in the prior art have disclosed processes for hydrogenating carbon monoxide to produce hydrocarbons using catalysts such as sintered iron promoted with an alkali metal compound and reduced in a hydrogen atmosphere, or by the reduction or oxidation of iron or of metals of the iron group in mixtures of hydrogen and steam. The crystal structure of the several iron oxides is well known from the results of X-ray diffraction examination. The prior art workers have also employed as catalysts for the Fischer synthesis process reduced $Fe_3O_4$ or reduced alpha ferric oxide; these catalysts were prepared by reducing promoted $Fe_3O_4$ crystals directly or by reducing alpha $Fe_2O_3$ crystals.

In accordance with the present invention, carbon monoxide and hydrogen are brought into contact with an iron oxide type catalyst under suitable temperatures and pressures to produce high yields of hydrocarbons as well as oxygenated organic compounds. The iron oxides are employed as catalyst in accordance with the present invention and are prepared by introduction in the manufacture thereof the intermediate step of adding a promotional quantity of an alkali metal trioxalato ferriate such as potassium trioxalato ferriate, $K_3Fe(C_2O_4)_3.3H_2O$. The iron oxide and the alkali metal trioxalato ferriate are intimately admixed and are then subjected to a calcining operation at an elevated temperature and in the presence of a free oxygen-containing gas to cause oxidation thereof. Following the calcining treatment, the catalyst mixture is then subjected to a reducing atmosphere at an elevated temperated for a substantial period of time to cause reduction of the oxidized mass. Subsequent to the oxidizing and reducing treatment, the catalyst is employed in the synthesis of hydrocarbons and oxygenated organic compounds from a mixture of carbon monoxide and hydrogen.

Accordingly, the present invention may be described briefly as involving the contacting of a mixture of hydrogen and carbon monoxide with a catalyst which is obtained by subjecting to a reducing atmosphere at superatmospheric temperatures iron oxide either in the form of alpha or gamma ferric oxide crystals or in the form of ferro-ferric oxide with the feed gases being maintained at temperature and pressure conditions to cause the formation of substantial amounts of hydrocarbons and oxygenated hydrocarbons on passage over the catalyst.

It is preferred to contact the mixture of hydrogen and carbon monoxide with the catalyst at a temperature in the range of 450° to 675° F. and at a pressure within the range of 100 to 500 pounds per square inch gauge. It is also desirable for the hydrogen and carbon monoxide to be present in ratios within the range of 2:1 to 1:1 and to use feed rates within the range of 100 to 1500 volumes of feed per volume of catalyst per hour.

As mentioned before, the iron oxide may be the alpha or gamma crystalline form of iron oxide before the reduction treatment or may be a mixture of ferro-ferric oxide before the reduction treatment. The alkali metal trioxalato ferriate may be potassium trioxalato ferriate, sodium trioxalato ferriate, or lithium trioxalato ferriate. Ordinarily, it will be preferred to employ the sodium or potassium trioxalato ferriate instead of the lithium trioxalato ferriate in view of the more expensive nature of the latter over the former.

The catalytic mass comprising iron oxide and the alkali metal trioxalato ferriate may be formed in any convenient manner and employed in the practice of the present invention. As one method for producing the catalyst mass, iron oxide, such as ferro-ferric oxide, may have added to it a suitable quantity of an alkali metal trioxalato ferriate, such as potassium trioxalato ferriate, and the admixture dissolved or suspended in a suitable amount of water to form a thin, mullable slurry of the iron oxide mixture. After thorough mixing of the slurry, it may be dried, for example in an oven, at 100° C. and the dried mass pulverized and then pelleted. The resulting pills may then be heated for about 4½ hours in the presence of a free oxygen-containing gas such as air at a temperature of 1000° F. The resultant mass is then reduced with hydrogen gas at a temperature within the range of about 700° to 1600° F.

The amount of the alkali metal trioxalato ferriate in the catalyst mass employed in the process of the present invention will vary from about 0.2 to about 20 weight per cent, the remainder comprising iron oxide either in the alpha or gamma form or as ferro-ferric oxide. Preferably from about 2% to 5% of the alkali metal trioxalato ferriate is employed.

The practice of the present invention may now be described by reference to the drawing which is a single figure in the form of a flow diagram showing a mode of practicing one embodiment thereof.

Turning now specifically to the drawing, a mixture of carbon monoxide and hydrogen at the pressure desired for the synthesis reaction is passed through an inlet line represented by the numeral 11 into reactor 12. Within reactor 12 is arranged a catalyst mass 13 which has been prepared by the reduction of a mixture of an alkali metal trioxalato ferriate and iron oxide. Since the reaction of carbon monoxide and hydrogen is exothermic, tremendous amounts of heat are evolved during the reaction and must be removed from the catalyst bed 13. In order to maintain the temperature of the catalyst bed within the limits required for optimum conversion, a space is provided between reactor bed 13 and vessel 12 and a suitable fluid is passed into the space by inlet line 9 and withdrawn through outlet 10 for controlling the temperature of the catalyst bed.

The effluent from the catalyst bed 13 containing unreacted carbon monoxide and hydrogen, hydrocarbons and oxygenated compounds such as alcohols, carbon dioxide and water is removed through line 14 and passes through a cooling means 15 wherein the major portion of hydrocarbons and water are liquefied. The mixture is withdrawn from cooling means 15 and discharged into a settling means 16 where the total mixture is separated into a hydrocarbon phase and a water phase. Water is withdrawn continuously from settler 16 through line 17 and the hydrocarbon layer is withdrawn continuously through line 18. Non-condensible materials contained in the effluent may be withdrawn from the top of settling means 16 through line 19; these exit gases may be conducted to a separation means, not shown, in order to recover unreacted carbon monoxide and hydrocarbon for recycling to the reactor 12 or may be recycled to the reactor as such.

The liquid hydrocarbon layer is passed through line 18 containing pump 20 and discharged into a distilling means 21, heat being supplied by heating coils 22 to heat the hydrocarbons therein. Hydrocarbon fractions suitable for use as motor fuels, Diesel fuel or components of lubricating oils may be withdrawn from distilling means 21 through lines 23, 24, 25, 26, and 27. A heavy bottoms fraction is withdrawn through line 28 and may be employed as a lubricating oil or as a fuel oil.

It will be recognized by those skilled in the art that the hydrocarbons withdrawn from distillation unit 21 may be employed for many purposes. For example, light olefins, boiling in the range of $C_4$ and $C_5$ hydrocarbons may be alkylated with an isoparaffin, such as isobutane, in the presence of a suitable catalyst to produce a high octane motor fuel. Also, the liquid fractions obtained in the synthesis process may be hydrogenated to improve the stability and octane characteristics thereof. It is to be pointed out that it may be desirable to recover oxygenated organic compounds from both the water and hydrocarbon phases removed from settler 16; the more water-soluble oxygenated hydrocarbons will be present in the water phase whereas the high molecular weight oxygenated compounds which are relatively insoluble in water will be present in the hydrocarbon phase.

While the above discussion has described a method for carrying out the synthesis reaction in the presence of catalysts employing a fixed bed operation, it is to be pointed out that other methods for carrying out the aforesaid synthesis reaction may at times be desirable. For example, the catalyst may be employed in the form of a suspension in a gaseous stream and passed through the reaction zone. The technique for carrying out reactions in a suspension of catalyst, commonly designated as a fluidized catalyst, are well known and accordingly the details of such an operation will not here be given. The catalyst employed in the process of my invention lends itself well to use either in the form of pellets or pills for the fixed bed type of operation or to use as a finely divided powder suspended in a gaseous stream in the fluid catalytic synthesis operation.

The catalyst mass employed in accordance with the present invention prior to its use in the synthesis of hydrocarbons from carbon monoxide and hydrogen is preferably reduced for about 24 hours with hydrogen gas at atmospheric pressure, a temperature of 700° F. with the hydrogen gas passing over the catalyst at a feed rate of 1000 volumes per volume of catalyst per hour. In one particular operation, an equi-volume mixture of hydrogen and carbon monoxide was passed over a catalyst mass, produced as described, at a temperature ranging from 550° to 575° F., a pressure of 150 pounds per square inch gauge, and at a feed rate of 200 volumes per volume of catalyst per hour. In this particular instance, the catalyst comprised substantially 95% of ferro-ferric oxide and 5% of potassium trioxalato ferriate. This catalyst was employed to synthesize hydrocarbons and oxygenated organic compounds for a period of 264 hours. The results are summarized in the following table:

| Temperature, °F | 550 | | | | 550-575 | | | | 575 | | |
|---|---|---|---|---|---|---|---|---|---|---|---|
| Pressure, p. s. i. g. | 150 | | | | | | | | | | |
| Feed Rate, V./V./Hr. | 200 | | | | | | | | | | |
| H₂/CO Ratio (Charge) | 0.95 | 0.94 | 0.94 | | 1.06 | 1.10 | 1.07 | 1.03 | 0.91 | 1.00 | 0.99 |
| Hours on Stream | 0-24 | 24-48 | 48-72 | 72-96 | 96-120 | 120-144 | 144-168 | 168-192 | 192-216 | 216-240 | 240-264 |
| CO Conversion, Mol Per Cent | | 96.4 | 95.8 | | 91.0 | 91.6 | 97.4 | | 97.2 | | 96.5 |
| Output Yields, cc./M³ of H₂+CO Cons.: | | | | | | | | | | | |
| C₄+Hydrocarbon | | 125 | 233 | | 149 | 231 | 191 | | 189 | | 163 |
| Water | | 49 | 31 | | 41 | 48 | 57 | | 42 | | 49 |
| Hydrocarbon Test Data:[1] | | | | | | | | | | | |
| Specific Gravity | 0.7830 | | | | 0.7709 | | | | | | |
| Bromine Number | 49.2 | | | | 51.5 | | | | | | |
| Unsaturate Content [2] | 49.2 | | | | 51.5 | | | | | | |
| Alpha Olefin [3] | | | | | 56.8 | | | | | | |
| Beta Olefin | | | | | 26.6 | | | | | | |
| Alpha/Beta Olefin ratio | | | | | 2.2 | | | | | | |
| Alcohol, weight per cent C₅H₁₁OH | | | | | 10.7 | | | | | | |
| Carbonyl, weight per cent (C₂H₅)₂CO | 2.6 | | | | 4.9 | | | | | | |
| Acid, weight per cent C₄H₉COOH | 1.7 | | | | 1.4 | | | | | | |
| Water Test Data: | | | | | | | | | | | |
| Alcohol, weight per cent C₂H₅OH | 14.6 | | | | 12.8 | | | | | | |
| Carbonyl, weight per cent (CH₃)₂CO | 1.1 | | | | 3.0 | | | | | | |
| Acids, weight, per cent, CH₃COOH | 0.2 | | | | 0.2 | | | | | | |

[1] Based on recovered liquid product.
[2] Based on 160 assumed molecular weight.
[3] Calculated as bromine number based on olefin type determination by infrared absorption, uncorrected for oxygenated compound interference.

It will be apparent from the foregoing data that substantial yields of hydrocarbons were produced throughout the operating period and that even when the run was discontinued, the catalyst was still capable of synthesizing substantial amounts of hydrocarbons. This is equally true for the oxygenated compounds produced and obtained from the hydrocarbon layer and the water layer. Particular attention is directed to the ratio of alpha to beta olefins which over a substantial operating time was 2.2. This is considered highly significant since the large amount of alpha olefin as compared to beta olefin makes the product particularly attractive for use in the production of lubricants, the alpha olefin having been demonstrated to be particularly suitable for polymerization to high molecular weight polymers for use as lubricants.

In another run in accordance with the process of the present invention, a mixture of 95% of alpha iron oxide and 5% of potassium trioxalato ferriate was oxidized at 1000° F. for about 4½ hours and then reduced by passing hydrogen over it at 700° F. for about 24 hours at a feed rate of hydrogen gas of 1000 volumes per volume of catalyst per hour. The catalyst was then employed to synthesize hydrocarbons from a mixture of hydrogen and carbon monoxide at a feed rate varying from 194 volumes of synthesis gas mixture per volume of catalyst per hour to 212 volumes of synthesis gas per volume of catalyst per hour. During the operating period, substantial quantities of C₄ and heavier hydrocarbons and water were produced. The foregoing operation was conducted at a temperature of 550° F. and a pressure of 150 pounds per square inch gauge. Since the yields from the run at 550° F. with the alpha iron oxide and potassium trioxalato ferriate over the period investigated varied widely, the run was continued over a period of several days at a higher temperature of 600° F. and at a pressure of 150 pounds per square inch gauge. Substantial yields of hydrocarbons and oxygenated organic compounds as well as water were obtained. The amount of C₄ and heavier hydrocarbons varied from 160 cc. per cubic meter of feed gas to as high as 202 cc. of C₄ and heavier hydrocarbons per cubic meter of feed gas while the amount of water produced varied from 100 cc. to 167 cc. per cubic meter of feed gas.

It will be apparent from the foregoing runs that substantial quantities of hydrocarbon and oxygenated organic compounds may be produced in accordance with the present invention employing the catalyst described.

Although specific examples illustrating the practice of the present invention have been given, these examples are for illustrative purposes only and are not intended to limit the scope of the invention. It is to be understood that the present invention is directed to a method for obtaining hydrocarbons and oxygenated organic compounds involving contacting a mixture of CO and H₂ at suitable temperatures and pressures with a catalyst which, before reduction, comprises a major portion of iron oxide in the form of alpha or gamma oxide crystals or ferro-ferric oxide and a minor portion of an alkali metal trioxalato ferriate. It will be apparent to a worker skilled in the art that while specific examples of preferred temperature and pressure ranges for conducting the operation have been given, other conditions may at times be desirable and may be employed without departing from the scope of the invention.

Having described and illustrated the practice of the present invention, what I desire to claim as new and useful and to secure by Letters Patent is:

1. A method for producing hydrocarbons and oxygenated organic compounds including the steps of contacting a gaseous mixture of carbon monoxide and hydrogen under superatmospheric temperatures and pressures with a catalyst prepared by reducing at a temperature within the range between 700° and 1600° F. a mass comprising a major portion of iron oxide and a minor portion of potassium trioxalato ferriate to produce a substantial amount of hydrocarbons and oxygenated hydrocarbons.

2. A method of producing hydrocarbons and oxygenated organic compounds including the step of contacting a gaseous mixture of carbon monoxide and hydrogen at superatmospheric temperatures and pressures with a catalyst prepared by the reduction at a temperature within the range between 700° and 1600° F. of a mass comprising a major portion of iron oxide and a minor portion of an alakli metal trioxalato ferriate to obtain a substantial amount of hydrocarbons and oxygenated hydrocarbon product.

3. A process for producing hydrocarbons and oxygenated hydrocarbons including the steps of passing a gaseous mixture of carbon monoxide and hydrogen at a temperature within the range of 450° to 675° F. and a pressure in the range of 100 to 500 pounds per square inch gauge over a catalyst prepared by the reduction at a temperature within the range between 700° and 1600° F. of a mixture comprising a major portion of iron oxide and a minor portion of an alkali metal trioxalato ferriate to produce a substantial amount of hydrocarbon and oxygenated hydrocarbons, removing products from contact with the catalyst, and recovering hydrocarbons and oxygenated hydrocarbons therefrom.

4. A process in accordance with claim 3 in which before reduction the major portion of iron oxide is present within the range of 80 and 99.8% and the minor portion of the alkali metal trioxalato ferriate is present within the range of 0.2 and 20% by weight.

5. A process for producing hydrocarbons including the steps of passing a gaseous mixture of carbon monoxide and hydrogen at a temperature within the range of 450° to 675° F. and a pressure in the range of 100 to 500 pounds per square inch gauge over a catalyst mass prepared by the reduction of mixture comprising a major portion of iron oxide and a minor portion of potassium trioxalato ferriate to obtain a substantial amount of hydrocarbons and oxygenated hydrocarbon product, removing product from contact with the catalyst and recovering hydrocarbons and oxygenated hydrocarbons therefrom.

6. A process in accordance with claim 5 in which the iron oxide is alpha iron oxide.

7. A process in accordance with claim 5 in which the iron oxide is gamma iron oxide.

8. A process in accordance with claim 5 in which the iron oxide is ferro-ferric oxide.

9. A process in accordance with claim 5 in which before reduction the potassium trioxalato ferriate is present in the catalyst mass in an amount within the range from 0.2 to 20%, based on the weight of the total mixture.

JAMES C. SCHILLER.

REFERENCES CITED

The following references are of record in the file of this patent:

UNITED STATES PATENTS

| Number | Name | Date |
|---|---|---|
| 1,801,382 | Wietzel et al. | Apr. 21, 1931 |
| 2,183,145 | Michael et al. | Dec. 12, 1939 |
| 2,345,957 | Wirth et al. | Apr. 4, 1944 |

FOREIGN PATENTS

| Number | Country | Date |
|---|---|---|
| 293,943 | Germany | Feb. 11, 1913 |

OTHER REFERENCES

Handbook of Chemistry and Physics, 27th ed., Chemical Rubber Publishing Company, page 436.

Treadwell et al.: "Analytical Chemistry," 7th English edition, 1930, vol. 1, page 385.

Mellor: "Cemprehensive Treatise on Theoretical and Inorganic Chemistry," vol. 13, page 906, Longmans Green Co., 1934.

Le Clerc: "Comptes Rendus," vol. 207 (1938), pages 1099–1101.